United States Patent
Chao et al.

(10) Patent No.: US 7,358,964 B2
(45) Date of Patent: Apr. 15, 2008

(54) ELECTROMAGNETIC INDUCTIVE SYSTEM WITH MULTI-INDUCTION LOOP LAYOUT AND BATTERY LESS POINTER DEVICE AND ITS METHOD FOR LOCATING THE COORDINATE

(75) Inventors: Ching-Chuan Chao, Taipei (TW); Chung-Wen Hsu, Kaohsiung (TW)

(73) Assignee: Waltop International Corp., Hsin-Chu (TW)

( * ) Notice: Subject to any disclaimer, the term of this patent is extended or adjusted under 35 U.S.C. 154(b) by 253 days.

(21) Appl. No.: 10/253,874

(22) Filed: Sep. 25, 2002

(65) Prior Publication Data

US 2004/0055793 A1 Mar. 25, 2004

(51) Int. Cl.
G06F 3/041 (2006.01)
G06F 3/033 (2006.01)
G06F 3/044 (2006.01)
G06F 3/045 (2006.01)

(52) U.S. Cl. .................. 345/179; 345/173; 178/18.01; 178/18.05; 178/18.06

(58) Field of Classification Search ................ 345/179, 345/173; 178/18.03, 18.01, 18.07, 19.01, 178/19.03, 18.05, 18.06
See application file for complete search history.

(56) References Cited

U.S. PATENT DOCUMENTS

| | | | | |
|---|---|---|---|---|
| 5,028,745 A | * | 7/1991 | Yamanami et al. ...... | 178/18.07 |
| 5,122,623 A | * | 6/1992 | Zank et al. ............... | 178/19.04 |
| 5,136,125 A | * | 8/1992 | Russell .................... | 178/18.07 |
| 5,408,055 A | * | 4/1995 | Harris et al. ............. | 178/19.07 |
| 5,600,105 A | * | 2/1997 | Fukuzaki et al. ........ | 178/19.06 |
| 5,619,431 A | * | 4/1997 | Oda ........................... | 702/150 |
| 5,644,108 A | * | 7/1997 | Katsurahira et al. ..... | 178/18.07 |
| 5,672,852 A | * | 9/1997 | Fukuzaki et al. ........ | 178/18.07 |
| 5,682,019 A | * | 10/1997 | Katsurahira et al. ..... | 178/18.07 |
| 5,729,251 A | * | 3/1998 | Nakashima ................ | 709/250 |
| 5,751,229 A | * | 5/1998 | Funahashi ..................... | 341/5 |
| 5,792,997 A | * | 8/1998 | Fukuzaki ................. | 178/18.07 |
| 5,854,881 A | * | 12/1998 | Yoshida et al. ........... | 345/104 |
| 6,002,387 A | * | 12/1999 | Ronkka et al. ............. | 345/157 |
| 6,118,084 A | * | 9/2000 | Landmeier ............... | 178/18.01 |
| 6,259,438 B1 | * | 7/2001 | Fleck et al. ................ | 345/184 |
| 6,396,005 B2 | * | 5/2002 | Rodgers et al. .......... | 178/18.01 |
| 6,606,087 B1 | * | 8/2003 | Tomomatsu ................ | 345/174 |
| 6,639,585 B1 | * | 10/2003 | Nagai et al. ................ | 345/173 |
| 6,888,538 B2 | * | 5/2005 | Ely et al. .................... | 345/173 |

\* cited by examiner

*Primary Examiner*—Chante Harrison
(74) *Attorney, Agent, or Firm*—Rosenberg, Klein & Lee

(57) ABSTRACT

A multi-induction loop layout of an electromagnetic inductive system is disclosed. The multi-induction loop layout of the invention comprises a plurality of inductive loops, one terminal of each inductive loop connecting to a loop switch, and the other terminal connecting to the common node. Every logical inductive loop is a relative close inductive loop, the relative close inductive loop possessing a plurality of ⊓-type sections, forming a sawtooth-shaped region and corresponding to and closing each other to form a plurality of close-like regions. The form of which gradually approaches the multi-induction loop layout.

14 Claims, 8 Drawing Sheets

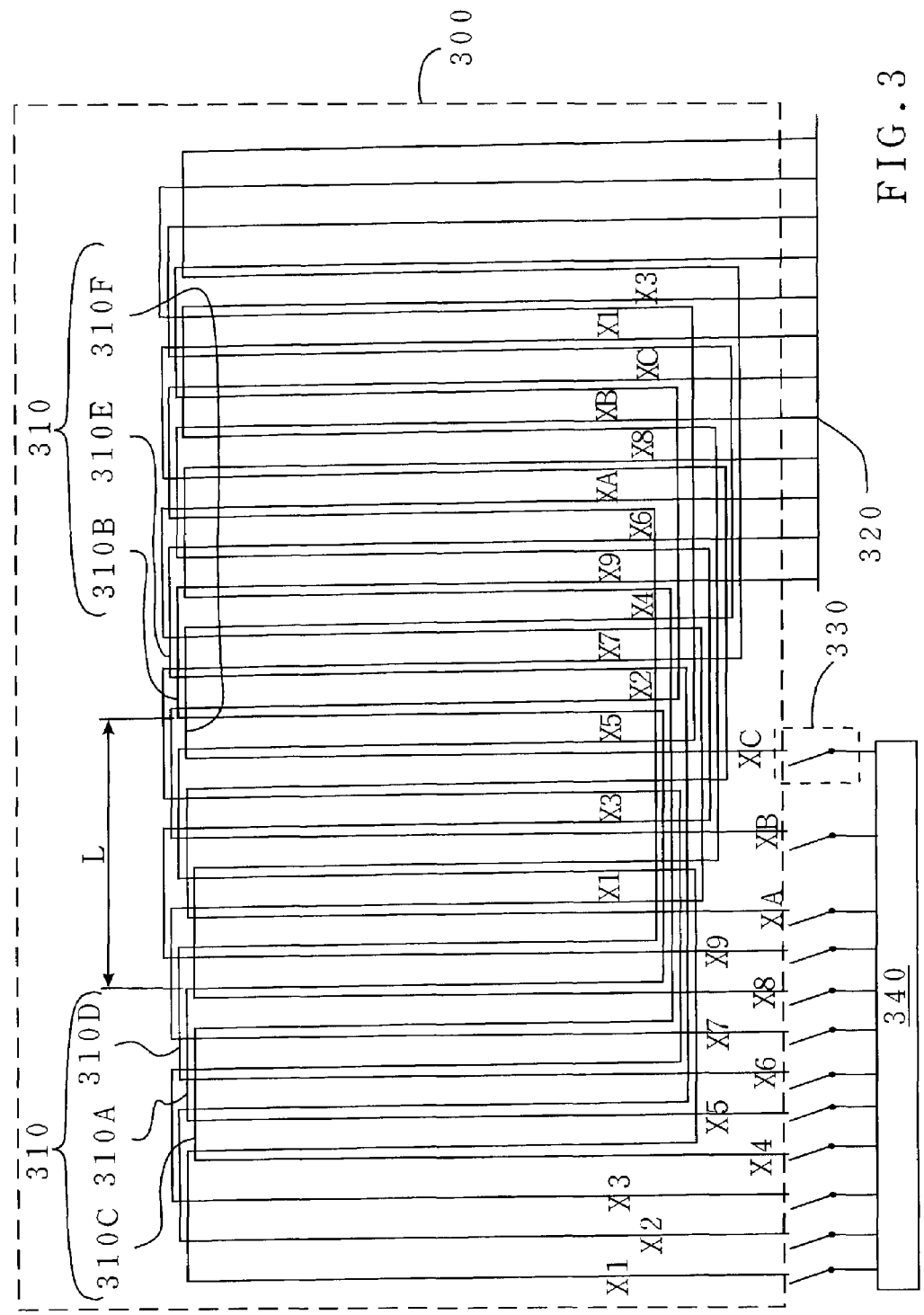

Loop Arrangement Table

| Physical Inductive Loop | 1 | 2 | 3 | 4 | 5 | 6 | 7 | 8 | 9 | A | 1 | B | 3 | C | 5 | 2 | 7 | 4 | 9 | 6 |
|---|---|---|---|---|---|---|---|---|---|---|---|---|---|---|---|---|---|---|---|---|
| Logic Address | 1 | 2 | 3 | 4 | 5 | 6 | 7 | 8 | 9 | 10 | 11 | 12 | 13 | 14 | 15 | 16 | 17 | 18 | 19 | 20 |

Loop Arrangement Table

| Physical Inductive Loop | A | 8 | B | C | 1 | 3 | 5 | 7 | 9 | 2 | 4 | 6 | 8 | C | A | B | 5 | 1 | 7 | 3 | 9 |
|---|---|---|---|---|---|---|---|---|---|---|---|---|---|---|---|---|---|---|---|---|---|
| Logic Address | 21 | 22 | 23 | 24 | 25 | 26 | 27 | 28 | 29 | 30 | 31 | 32 | 33 | 34 | 35 | 36 | 37 | 38 | 39 | 40 | 41 |

FIG. 4C

Adjacent Table

| Physical Inductive Loop | Adjacent Physical Inductive Loop |
|---|---|
| 1 | 2-A-B-C-3-5-7 |
| 2 | 1-3-5-7-9-4 |
| 3 | 2-4-B-C-1-5-7-9 |
| 4 | 3-5-7-9-2-6 |
| 5 | 4-6-C-2-3-7-B-1 |
| 6 | 5-7-9-A-4-8 |
| 7 | 6-8-2-4-5-9-1-3 |
| 8 | 7-9-A-B-6-C |
| 9 | 8-A-4-6-7-2-3 |
| A | 9-1-6-8-C-B |
| B | 1-3-8-C-A-5 |
| C | 3-5-B-1-8-A |

FIG. 4D

ELECTROMAGNETIC INDUCTIVE SYSTEM WITH MULTI-INDUCTION LOOP LAYOUT AND BATTERY LESS POINTER DEVICE AND ITS METHOD FOR LOCATING THE COORDINATE

BACKGROUND OF THE INVENTION

1. Field of the Invention

The present invention generally relates to a multi-induction loop layout of an electromagnetic inductive system, and more particularly to a method for locating the coordinates of the multi-induction loop layout of an electromagnetic inductive system.

2. Description of the Prior Art

Since a handwriting input device can replace a mouse and allow users to input words and pictures by hand, more easily than a mouse, the field of improvement of a handwriting input device has developed rapidly in recent years. The early handwriting input device replaces a mouse with a pen. In order to increase the convenience of operation for the user, a cordless pointer device, such as a pen, a mouse, a puck or a stylus with a digitizer tablet is usually used. The tip of the cordless pen or stylus corresponds with the left key of the mouse. Although conventional pen-input products have existed for several years, similar kinds of products generally focus on the application of a single function such as graphing, drawing or Chinese text key-in.

The conventional electromagnetic inductive system is equipped with a digitizer tablet and a mouse or pen-transducer/pointer device. Generally speaking, there are two modes of presented the position the pointer device located on the active area of the tablet: the relative mode and the absolute mode. The mechanical or optical type mouse device generally functions in the relative mode, that is to say, when the mouse glides on the surface of the mouse pad, the computer system receives the cursor information from the mouse and it can only identify the relative movement in X and Y directions. A common technique is to implement a pair of mutually perpendicular altering signals in the mouse, these two signals corresponding to the longitudinal and transverse movement of the mouse. In contrast, the cursor device of the tablet, such as cordless pointer device, generally functions in the absolute mode. As far as the computer system is concerned, once the pointer device is operated and moved to another place on the active area of the tablet, the signal changes in order to response the new absolute coordinates of the pointer device. Nowadays, there have already been several methods for positioning the pointer device on the active area of the tablet, and the electromagnetic field inductive technique is the technique that generally applies to the absolute mode. The early transducer/pointer devices were connected to the tablet with a set of wires, delivering the information of coordinates and switch/pressure status to the computer system with interface. Some cordless transducers/pointer devices in the prior art indicated the use of different functions by changing the frequency and/or phase, the functions included, pressing down the button, pressing the tip of the pointer device on the active area, and other similar functions. However, without careful handling, the change in frequency and phase could easily cause misjudgment in the desired function of the pointer device because of various external factors such as metallic objects, noise signals, exterior electromagnetic fields, etc. These problems become extraordinarily obvious when it comes to tablets of larger size. The conventional technique for improvement made to the tablet system, allows users to operate the pointer device with tablet system in dual mode, and therefore the information regarding relative mode and absolute mode can both be provided under the user's control.

The current pointer/input product is usually an electromagnetic inductive system. The electromagnetic inductive system usually comprises an electromagnetic pointer device and a tablet. The electromagnetic pointer device has an oscillation circuit and a battery, providing energy for transmitting the relative electromagnetic signal. Take the electromagnetic pointer device for example, when the tip of the pointer device is pressed, the inductance of the inductor changes, therefore the oscillation frequency also changes. The higher the pressure received by the pointer device, the greater the inductance changes, and the oscillation frequency, therefore the amount of the pressure exerted upon the pointer device tip of the can be obtained through the changing degree of frequency. There are also two switch keys on the side of the pen type cordless pointer device, the on/off status changes the transmitting frequency and the connecting/disconnecting a specific capacitor in the oscillation circuits. When the user presses the switch key, it can be identified through detecting the variation of frequency. The tablet also comprises elements such as a detective loop, an amplifier, and an ADC and so on. The central writing area of this conventional handwriting tablet is plaited by inductive loops, the layout is composed of double layers of a PCB and the inductive loops with two axial arranged in an array of equal distance. The major use of these inductive loops is to induce the electromagnetic signal transmitted by the electromagnetic pointer device. When the electromagnetic pointer device transmits the electromagnetic signal, these inductive loops will induce the electromagnetic signal and the microprocessor will receive the processed information of the pointer device through a signal processing circuit.

Generally speaking, the inductive loops of the conventional electromagnetic inductive device and its layout design makes the inductive loops a grid net with the X and Y axis arranged in an array at equal distance in order to induce the signal emitted from the electromagnetic pointer device and figure out its absolute coordinates. Referring to the inductive loops layout deployed according to the X direction of a two-dimensional orthogonal coordinate indicated in FIG. 1A. One terminal of each antenna loop 110A is connected respectively with one switch (from X1 to X25). The other terminal is connected with the common ground node 105A, through which, the signal induced by each antenna loop 110A can be obtained by controlling the switches X1 to X25 in order. Since the intensity of the magnetic field is an inverse proportion to the square of distance, the farther the distance between the electromagnetic pointer device that's transmitting the electromagnetic field and the inductive loops, the weaker is the signal induced by the inductive loops; in contrast, the nearer the distance between the electromagnetic pointer device that's transmitting the electromagnetic field and the inductive loops, the stronger is the signal induced by the inductive loops. Therefore, as long as the microprocessor of the tablet can scan through all the inductive loops one by one in sequence, and analyze the strength of the signals induced by each inductive loop, the inductive loops in which dominates the range the electromagnetic pointer device located can be identified. The coordinates of its position can be figured out. However, as far as a tablet of a larger size is concerned, the number of inductive loops arranged also increases, and therefore more loop switches are needed.

On the other hand, the development of current information products is aimed at a high-speed and high data rate process with multiple and excellent functions. But as the speed of processing and data rate increase, the phenomenon of electromagnetic interference will happened often. In some specific occasions of operating tablet system, there are usually other information products being used. Therefore the conventional tablet is easily interfered with by exterior electromagnetic fields and thus misjudgment is a result. As far as the tablet of a larger active area is demanded in commerce is concerned, the number of inductive loops needed increases, and therefore the number of loop switches will also increase greatly without a doubt. Referring to the conventional inductive loops layout in FIG. 1B, the inductive loops of X axis and Y axis are connected respectively with the common ground node 105A and 105B. The deployment of the inductive loops 110A and 110B will exceed the region of the common ground node 105A and 105B in order to form a close-like region. Therefore, the conventional tablet must reserve space bounded 170 to place the initial terminal of the inductive loops 110A and 10B that exceeds the common ground node 105A and 105B. This limits the miniaturization of a PCB for a handwriting tablet and makes it difficult to design and produce a tablet with the small boundary. In view of this, the present invention provides a multi-induction loop layout of the electromagnetic inductive system to eliminate the defect mentioned above.

SUMMARY OF THE INVENTION

In view of the prior art, focusing on the enhancement and to increase the function of the inductive loops of the conventional electromagnetic inductive system. The present invention provides a multi-induction loop layout of an electromagnetic inductive system with a battery-less pointer device (a pen, a mouse, a locating plate, etc.) and its method for calculating the coordinates, which is able to eliminate the said defect of the conventional electromagnetic inductive system.

One main purpose of the invention is to provide an electromagnetic inductive system with a battery-less pointer device and the multi-induction loops layout and its method for calculating the coordinates. The invention processes a procedure of calculating the coordinates through a battery-less pointer device and a multi-induction loop layout. Besides, the battery-less pointer device of the invention is consisted of a variable inductance element. When the inductance changes, the resonant frequency also changes, and therefore the frequency of the electromagnetic signal induced by the inductive loops also different. With this multi-induction loops layout, the invention can reduce the space demand of the electromagnetic inductive system and the size of its PCB (whether it is a inflexible or flexible PCB is not confined here). Thus the goal of minimizing the space bounded and the product appearance, reducing production costs, and intensifying the efficiency of the electromagnetic inductive system is achieved. Therefore, the invention fits in with economic benefit and industrial practicability.

Therefore, an electromagnetic inductive system with a battery-less pointer device and multi-induction loop layout with a coordinate-locating procedure is disclosed by the invention according to the above said purpose. The multi-induction loop layout of the invention comprises a multi-induction loop group deployed according to a inductive loop deployment table. The inductive loop layout in the inductive loop deployment table comprises a plurality of physical inductive loops that are distributed along the X and Y axis of the two-dimensional orthogonal coordinates system and each physical inductive loop comprises a plurality of logical inductive loops. As far as each physical inductive loop that's distributed in the same direction is concerned, the logical inductive loops that are adjacent to the two sides of each logical inductive loop belong to a different physical inductive loop. Besides, the scanning procedure is to scan the physical inductive loops with the loop deployment table built-in microprocessor. First, each loop switch is switched on its physical inductive loop in sequence in a specific time slot to transmit an electromagnetic signal. When the battery-less pointer device is in the region of the multi-induction loop layout, it induces the electromagnetic energy transmitted by the physical inductive loop. After the battery-less pointer device induces and stores the energy, the bi-direction loop switch of the physical inductive loop stops transmitting energy and starts to induce the energy transmitted by the battery-less pointer device. On the other hand, the positioning procedure of the battery-less pointer device of the electromagnetic inductive system includes, [Full Scan] and its [Partial Scan] procedure of X and Y direction in order to detect the first signal, possessing the highest voltage, the second signal, possessing the voltage second to the highest, and the third signal, possessing the third highest voltage orderly and figure out the accurate coordinates of the battery-less pointer device through the calculation of the internal circuit processing and microprocessor of the electromagnetic inductive system.

BRIEF DESCRIPTION OF THE DRAWINGS

The FIG. 1A shows the diagram of the inductive loops layout of the conventional electromagnetic inductive system in the direction of the X axis;

The FIG. 1B shows the diagram of the inductive loops layout of the conventional electromagnetic inductive system;

Figure 1A:
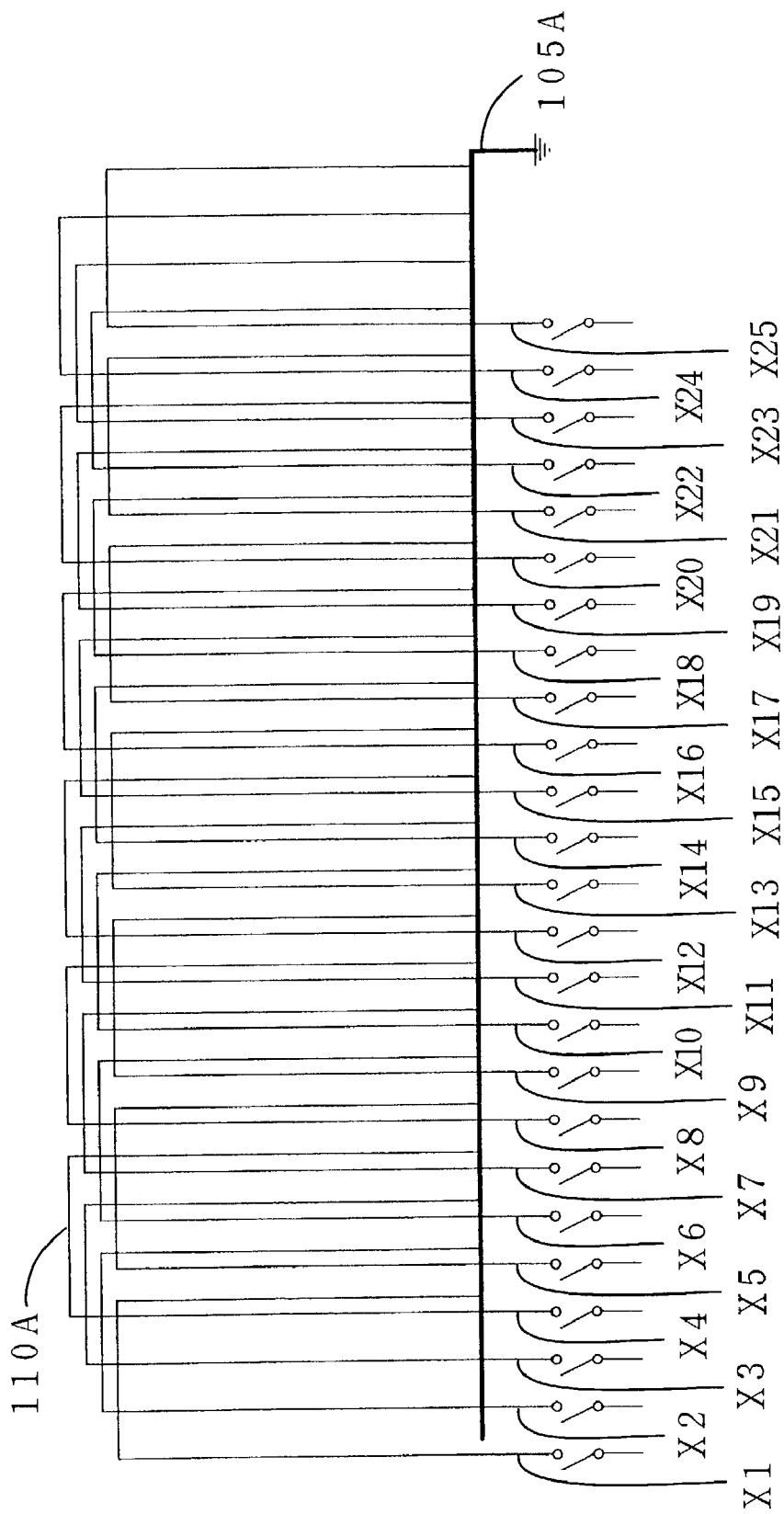
Figure 1B:
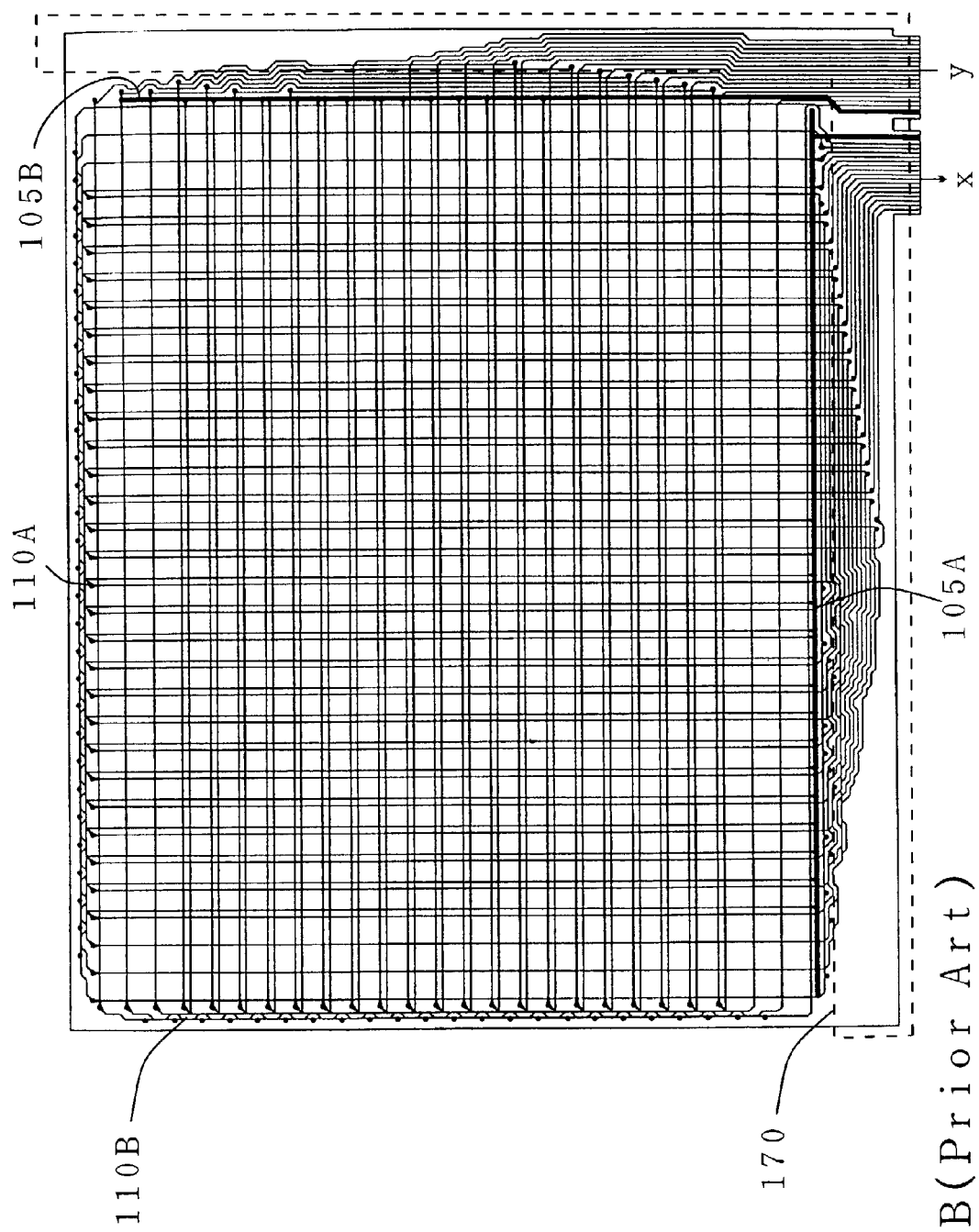
Figure 2:
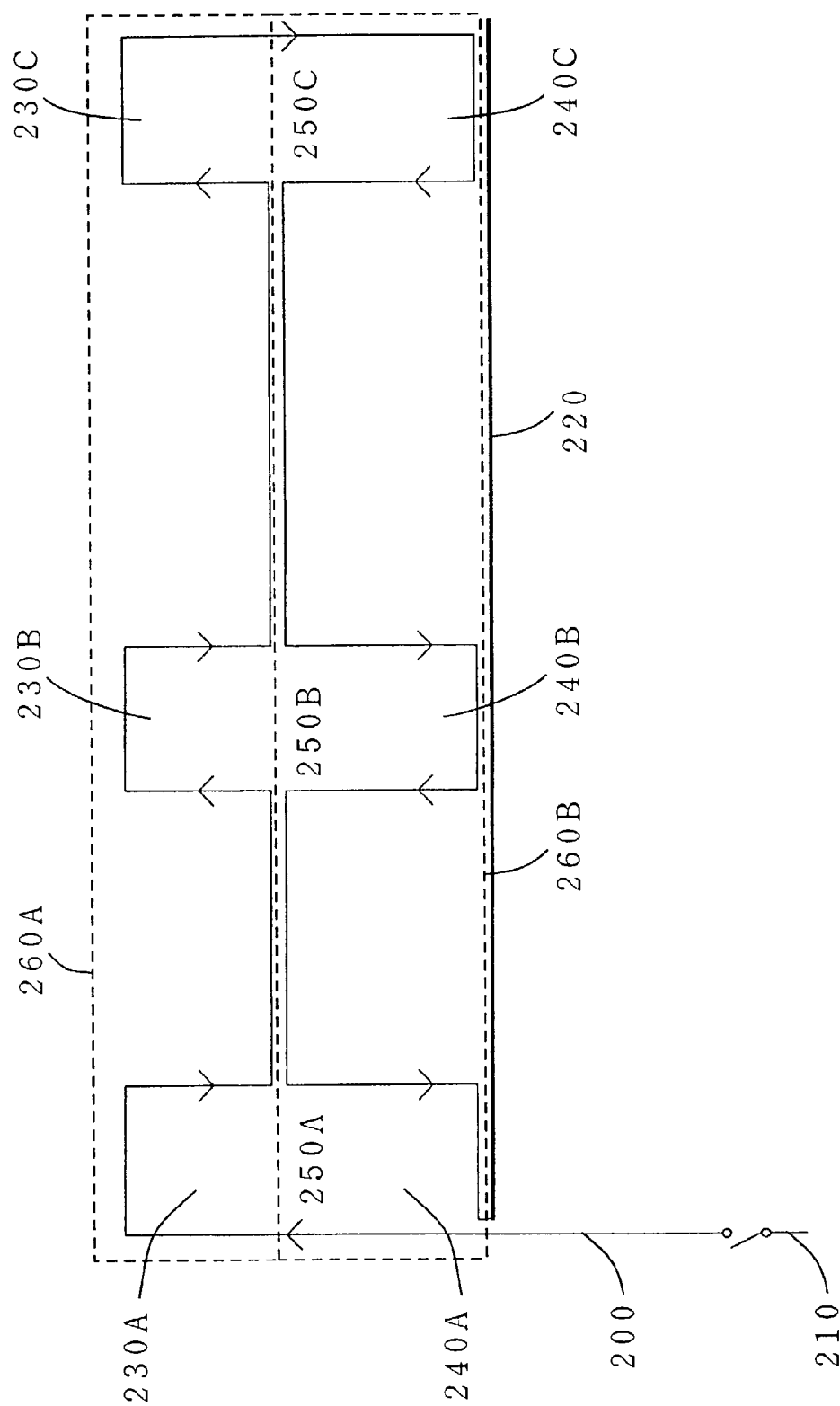
Figure 4A:
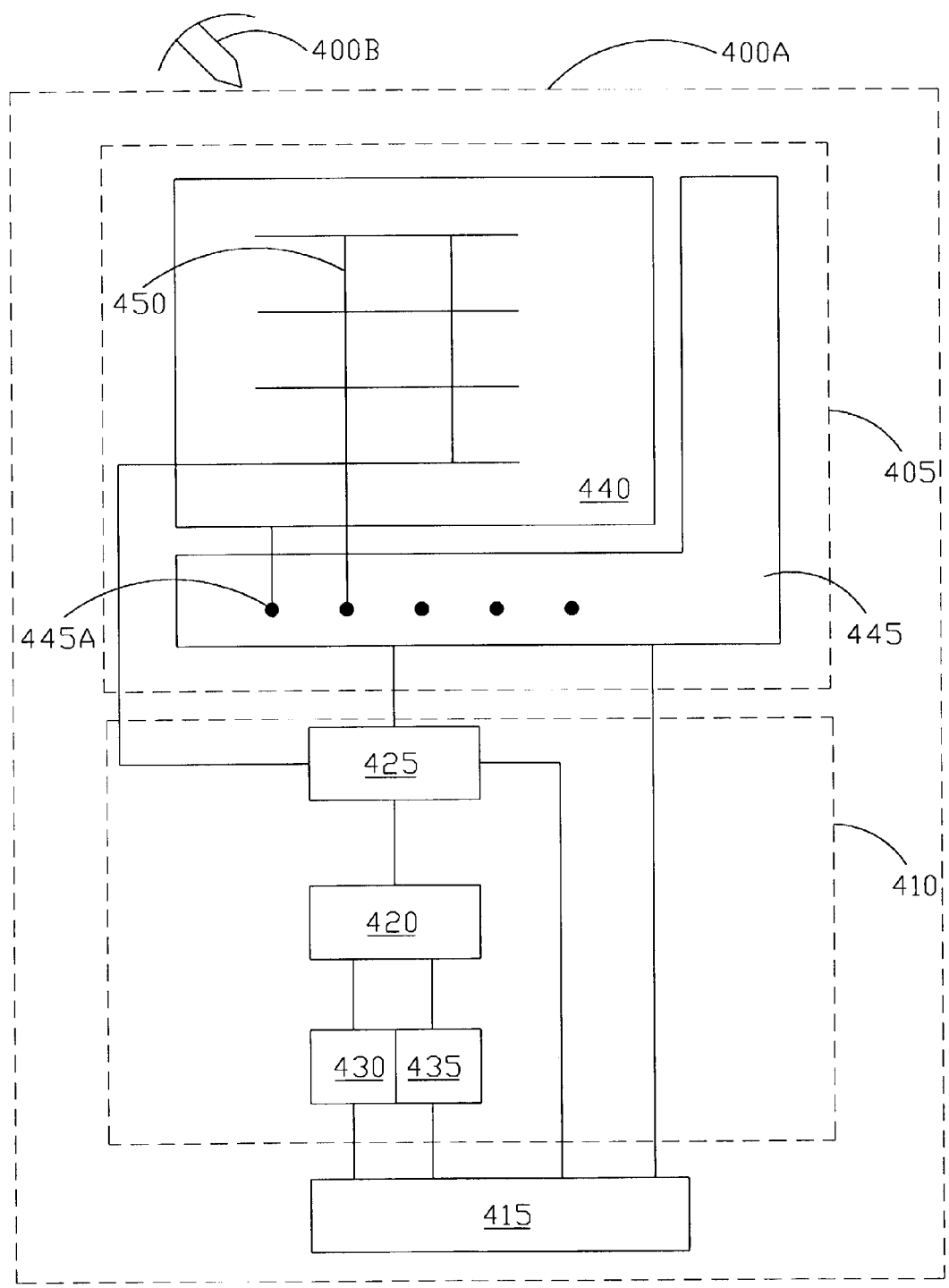
Figure 4B:
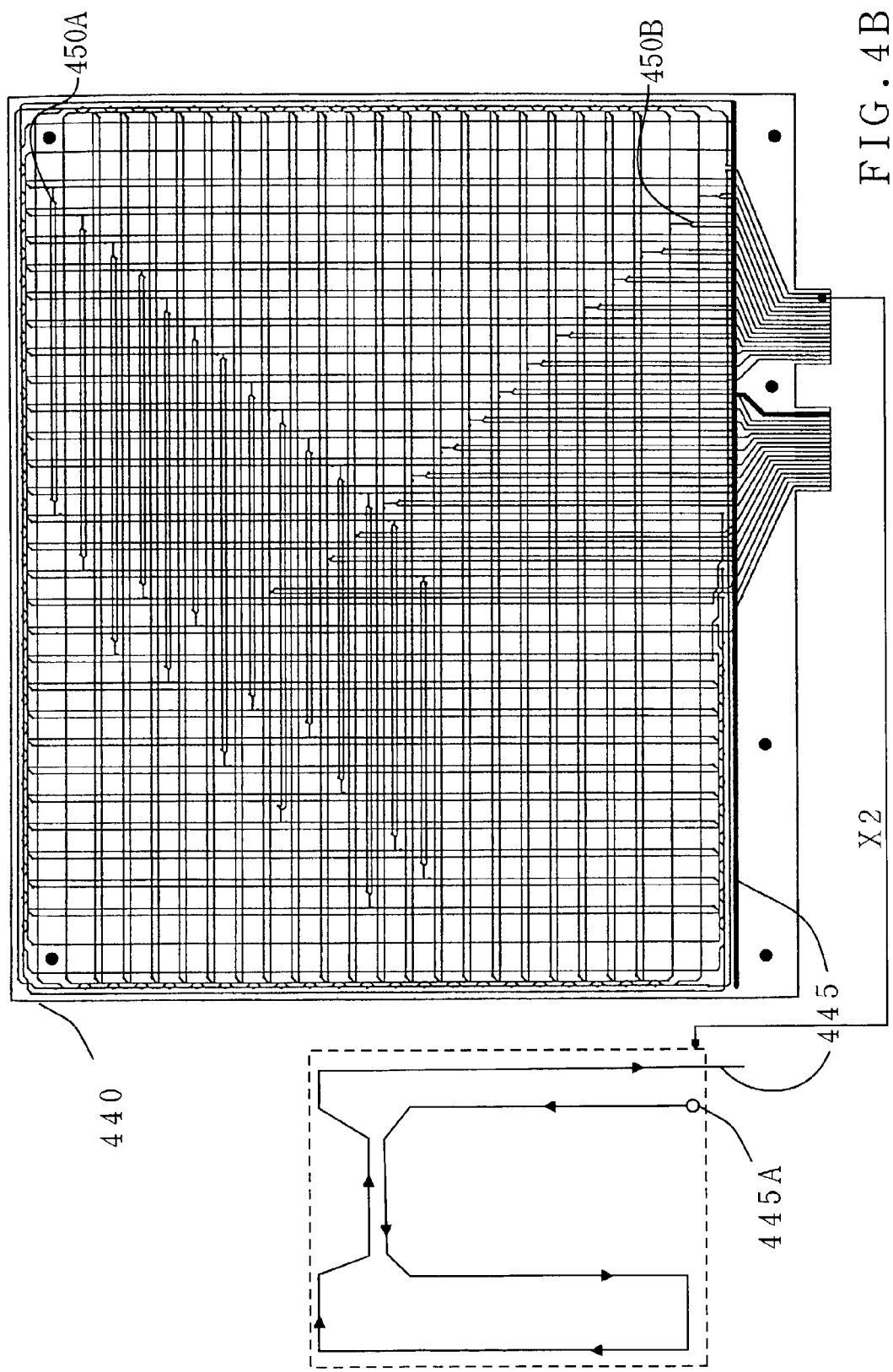

The FIG. 2 shows the diagram of multi-induction loops layout of the electromagnetic inductive system according to the first preferred embodiment of the invention (only the diagram of one physical inductive loop is shown here);

The FIG. 3 shows the diagram of the multi-induction loop layout of an electromagnetic inductive system according to the second preferred embodiment of the invention;

The FIG. 4A shows the circuit diagram of the electromagnetic inductive system according to the third preferred embodiment of the invention;

The FIG. 4B shows the diagram of the multi-induction loop layout of electromagnetic inductive system according to the third preferred embodiment of the invention;

The FIG. 4C shows the loop deployment table of electromagnetic inductive system according to the third preferred embodiment of the invention;

The FIG. 4D shows the adjacency table of electromagnetic inductive system according to the third preferred embodiment of the invention.

DESCRIPTION OF THE PREFERRED EMBODIMENT

What is probed into in the invention is a method for calculating the coordinates of an electromagnetic inductive system with a multi-antenna loop layout and battery-less pointer device. Detailed steps in production, structure and elements will be provided in the following description in order to make the invention thoroughly understood. Obviously, the application of the invention is not confined to specific details familiar to those who are skilled in electromagnetic inductive system. On the other hand, the common elements and procedures that are known to everyone are not described in the details to avoid unnecessary limits of the invention. The preferred embodiment of the invention will be described in detail in the following. However, besides this embodiment, with detailed description, the invention can also be applied extensively to other embodiments. The scope of the invention is not being defined by this preferred embodiment, but by the appended claims.

Referring to FIG. 2, in the first embodiment of the present invention, a multi-induction loop 200 is provided, one end of which being electrically coupled with a loop switch 210, and the other end of which being electrically coupled with a common node 220. The multi-induction loop 200 comprises a plurality of ⊓-type sections. For example, the first ⊓-type section 230A, the second ⊓-type section 230B, the third ⊓-type section 230C, the fourth ⊓-type section 240A, the fifth ⊓-type section 240B, and the sixth ⊓-type section 240C. The a plurality of ⊓-type sections 230A to 230C are composed of the first sawtooth-shaped region 260A. The a plurality of ⊓-type sections 240A to 240C are composed of a second sawtooth-shaped region 260B. The second sawtooth-shaped region 260B and the first sawtooth-shaped region 260A make up a relative close inductive loop. From each ⊓-type section 230A to 230C and each ⊓-type section 240A to 240C; opposite each other, form the relatively close-like regions 250A to 250C. The multi-induction loop is a physical inductive loop. The conducting wire loop forming the close-like regions 250A, 250B, and 250C are a plurality of logical inductive loops, that is to say, a physical inductive loop will include a plurality of logical inductive loops. This is the reason why the present technique is called "multi-induction loop".

Referring to FIG. 3, in the second embodiment of the invention, a multi-induction loop layout 300 (only the x axis of which is indicated) with a plurality of physical inductive loops (X1-X9 and XA-XC) is provided. Each physical inductive loop (from X1 to X9 and from XA to XC) is being deployed along the X axis of the orthogonal two-dimensional coordinates and composed by a plurality of logical inductive loops 310, which are essentially consistent ⊓-type sections. Each multi-induction loop (from X1 to X9 and from XA to XC) is electrically coupled with a corresponding loop switch 330, and the other terminal of the loop is electrically coupled with a common node 320. As far as the deployment of each multiple physical inductive loop in the same direction is concerned, each logical inductive loop 310 and other adjacent logical inductive loops, specifically correspond to a respective physical inductive loop (X1-X9 and XA-XC). Therefore, a specific logical inductive loop on which the pointer device is located within the inductive loop can be identified. Take a ⊓-type logical inductive loop 310A of the physical inductive loop X5 for example, the logical inductive loops adjacent to it, 310C and 310D, respectively belong to physical inductive loops X4 and X6. The logical inductive loops 310E and 310F adjacent to another ⊓-type logical inductive loop 310B of the physical inductive loop X5, respectively belong to the physical inductive loops X2 and X12. Therefore, whether the pointer device is located on the ⊓-type section 310A or 310B of the physical inductive loop X5, can be differentiated by referring to the inductive signal voltage produced by the physical inductive loops X4, X6, X2, and X12, to which the physical inductive loop X5 and the logical inductive loops adjacent to it correspond. The distance between the two adjacent logical inductive loops of the same physical inductive loop must be kept at an appropriate distance. For example, misjudgment in locating the pointer device occurs if the distance "L" is too short between the two adjacent ⊓-type logical inductive loops 310A and 310B of the physical inductive loop X5.

Referring to FIG. 4A, in the third embodiment of the invention, an electromagnetic inductive system 400A is provided. The pointer device, which is a battery-less pointer device 400B, has an electromagnetic inductive storage circuit that comprises a variable inductor. The electromagnetic inductive system 400A comprises a set of loops sub-circuit 405, an interior circuit 410, and a microprocessor sub-circuit 415. The interior circuit 410 comprising a filter and amplifier sub-circuit 420, a pre-amplifier sub-circuit 425, a waveform generating sub-circuit 430, and a frequency-to-voltage converter sub-circuit 435, and the loops sub-circuit 405 comprising a multi-inductive loop layout 440 and a group of the loop switches 445. The multi-inductive loop layout 440 comprises a plurality of physical inductive loops 450 that are electrically coupled respectively with a plurality of bi-direction loop switches 445A of the loop switch group 445, which is electrically coupled with the pre-amplifier sub-circuit 425 and controlled by a microprocessor sub-circuit 415. The pre-amplifier sub-circuit 425 is also electrically coupled with the filter and the amplifier sub-circuit 420 and controlled by the microprocessor sub-circuit 415. The filter and amplifier sub-circuit 420 is electrically coupled respectively with the waveform generating sub-circuit 430 and the frequency-to-voltage converter sub-circuit 435. The waveform generating sub-circuit 430 and the frequency-to-voltage converter sub-circuit 435 is electrically coupled with the microprocessor sub-circuit 415 respectively. After a signal is received by the a plurality of physical inductive loops 450, it's transmitted to, and amplified by the pre-amplifier sub-circuit 425, before being transmitted to the filter and amplifier sub-circuit 420, in order to filter out the noise signals of unnecessary frequency bands, and the signal is also amplified again, then transmitted to the waveform generating sub-circuit 430 and frequency-to-voltage converter sub-circuit 435 to produce a specific signal waveform and convert the signal frequency into a voltage signal. Finally to be transmitted respectively to the microprocessor sub-circuit 415 to proceed with the differentiation in the coordinates operation and non-position signal.

Referring to FIG. 4B, in the present embodiment, the a plurality of physical inductive loops 450A and 450B of the multi-induction loop layout 440 are deployed in the direction of the X axis and Y axis of the two-dimension orthogonal coordinates. One terminal of all physical inductive loops 450A and 450B is electrically coupled with the same common node 455. The other terminal of all physical inductive loops 450A and 450B is electrically coupled with a plurality of bi-direction loop switch 445A of the loop switch group 445. The a plurality of physical inductive loops 450A and 450B being composed by a connection of essentially consistent a plurality of ⊓-type sections. The multi-induction loop layout 440 is indicated in an inductive loop deployment table in FIG. 4C. The inductive loop deployment table (as FIG. 4C indicates) being built in the microprocessor sub-circuit 415 and containing an adjacency table (as FIG. 4C indicates) that indicates the adjacency relation between different physical inductive loops 450A and 450B and their corresponding logical inductive loops. There is a physical address for the position of each physical inductive loop (from X1 to X9 and from XA to XC) and there is a logical address (from 1 to 41) for the position of each logical inductive loop. The physical inductive loops of the adjacent logical inductive loops are not repeated. Take the physical inductive loop XC for example, its logical inductive loops are 13, 14, and 15, belonging respectively to physical inductive loops X3, XC, and X5, and the logical inductive loops of another section that belong to the same physical inductive loop XC are 23, 24, and 25. The physical inductive loops of which are XB, XC, and X1, and therefore the X3 and X5 as mentioned above do not appear since each appears only once.

According to the embodiment mentioned above, the electromagnetic inductive system 400A can locate its battery-less pointer device 400B by its inductive loop deployment table. The method for detecting the battery-less pointer device 400B is described as follows. First, after the electromagnetic inductive system 400A is started, the loop switch group 445 selects a signal according to the switch transmitted by the microprocessor sub-circuit 415, sets the bi-direction loop switch 445A on/off for each physical inductive loop 450A and 450B in the X direction and Y direction, one by one orderly according to time, and proceeds a [Full-Scan] procedure. The method of which, is that the physical inductive loop transmits an electromagnetic signal, which is induced and received by the battery-less pointer device 400B when the battery-less pointer device 400B approaches the multi-induction loop layout 440. The duration of switching on the bi-direction loop switch 445A determined by the default value of the microprocessor sub-circuit 415, which must be long enough for the energy storage of the battery-less pointer device to store energy fully. After the energy storage of the battery-less pointer device 400B is accomplished, and the inductive loop no longer transmits any electromagnetic signal, the battery-less pointer device transmits another electromagnetic signal to the a plurality of physical inductive loops that are on its location.

In the actual practicing process, a [Full-Scan] procedure is performed first to roughly find the logical address of the pointer device, and then the partial scan is proceeded according to this rough logical address. The so-called "[Full Scan] procedure" mentioned above is: first, in the first time slot of the scan process, the transmitting circuit is electrically connected with the physical inductive loop by switching the loop switch "ON", to which the first physical inductive loop corresponds. In this time slot, an electromagnetic signal is transmitted into the adjacent space. Second, in another time slot, the transmitting of an electromagnetic signal stops and the loop switch is not switched "OFF". The electromagnetic field of the adjacent space is induced and received by the inductive loop at the same time. In the following, a value relative to the intensity of the inductive signal is figured out through the process and the operation of the pre-amplifier circuit 425, the filter and amplifier circuit 420, and the microprocessor sub-circuit 415, etc. The record of which is set in the RAM (random access memory) of the microprocessor sub-circuit 415; then, the procedure mentioned above is proceeded again with the second physical inductive loop as its object of function. Then, the values relative to the intensity of the inductive signal are compared and the relation between them is recorded. The same procedure is repeated until it has been deployed in all the physical inductive loops. A maximum is searched in the records, if there is a maximum, the correspondence is proceeded according to the inductive loop deployment table and the [Partial Scan] is ready to proceed after several relative physical inductive loops are found. If there is not a maximum, the "[Full Scan] procedure" mentioned above is repeated until there is a maximum.

In the following is a description of the "[Partial Scan] procedure". When the physical inductive loop with a maximum is in one specific time slot, the electromagnetic signal is transmitted to an adjacent place. In the other time slot, the physical inductive loop, to which the logical inductive loop with the maximum and its adjacent a plurality of logical inductive loops (including the logical inductive loop with the maximum) correspond, induces and receives the signals, and records the value of each in the microprocessor sub-circuit 415. The signals are then arranged to find the strongest, the second strongest, and the third strongest, etc. These are called, the first signal, second signal, and the third signal, etc. The voltage of the first signal should be higher than or equal to that of the second signal, and the voltage of the second signal should be higher than or equal to that of the third signal. Finally, the accurate coordinates are figured out according to these three signals with the linear relationship, and the track of the pointer device is traced by comparing the physical inductive loop with the maximum to see whether it changes or not. Generally speaking, the microprocessor sub-circuit 415 traces and identifies the logical address of the battery less pointer device and figures out its coordinates through five voltage signals and the inductive loop deployment table.

Furthermore, in said "partial scan procedure," inductive signals of the three highest voltages have a feature that the second strongest signal and the third strongest signal are located on two sides of the first strongest signal. Therefore, it can be clearly known that battery less pointer device is located on the side where the strongest signal is located of physical antenna loop by identifying adjacent locations of physical antenna loop where the second strongest signal locates and physical antenna loop where the first strongest signal locates according to loop deployment table shown in FIG. 4C, and the precise address of battery less pointer device can be achieved more rapidly through calculating the first and second strongest signals by microprocessor sub-circuit 415.

In the embodiment of the present invention, each physical inductive loop can form a ⊓-type inductive loop after a circling of a plurality of, and therefore can intensify the first electromagnetic signal transmitted by the physical inductive loop and greatly increase the energy storage efficiency of the battery-less pointer device, thus intensifying the second electromagnetic signal transmitted, and reducing the time for energy storage. This enhances the ability of the second electromagnetic signal received by the physical inductive loop at the same time. Therefore, the ⊓-type logical inductive loop is formed after the a plurality of is transmitted through each physical inductive loop, which intensifies the voltage signal of the present multi-induction loop layout. The tablet of the invention can greatly enhance the stability of the system with its excellent S/N ratio. The number of the physical inductive loops of the embodiment of the present invention is not limited to 12 loops, the design of which, varying according to practical application.

According to the above descriptions, a positioning procedure through a battery-less pointer device and a multi-induction loop layout is performed in the present invention. The battery-less pointer device of the present invention possesses a variable inductance element, when the inductance of which changes, the resonant frequency also changes, thus the frequency of the electromagnetic signal transmitted by the battery-less pointer device that is induced by the inductive loop also varies. With this multi-induction loop layout, the invention can reduce space demand of the electromagnetic inductive system and the size of its PCB (whether it is inflexible type or flexible type is not limited) to achieve the goal of minimizing the space bounded and the product appearance. As a result, decreasing the production cost and enhancing the efficiency of the electromagnetic inductive system. Therefore, the invention fits in with economic benefit and industrial practicability.

Of course, in addition to the possible application in the multi-induction loop layout with the electromagnetic inductive system with battery-less pointer device, it is also possible for the invention to be applied in any method for the positioning of the multi-induction loops layout. Moreover, the process of finding the coordinates procedure through battery-less pointer device and multi-induction loops layout of the invention has never been developed and applied relating to the electromagnetic inductive system so far.

Obviously, there may be many modifications and differences in the invention according to the description of the embodiments mentioned above. Therefore it needs to be explained in the appended claims that, in addition to the detailed description given above, the invention can also be applied extensively in other embodiments.

What is mentioned above is only the preferred embodiments of the invention that cannot define the claims of the present invention. Any equivalent changes or modifications made without departing from the true spirit disclosed by the invention should be included in the scope of the appended claims.

What is claimed is:

1. A method for finding the coordinates of an electromagnetic inductive system with battery-less pointer device and a multi-induction loop layout having a plurality of physical inductive loops, said method comprising:
    proceeding a full scan procedure through said plurality of physical inductive loops to transmit a first electromagnetic signal;
    inducing said first electromagnetic signal and transmitting a second electromagnetic signal through a battery-less pointer device for the convenience of part of said plurality of physical inductive loops located on said battery-less pointer device to receive said second electromagnetic signal;
    transmitting said second electromagnetic signal to a microprocessor sub-circuit;
    searching an address of said physical inductive loop having maximum amplitude signal through an inductive loop deployment table in said microprocessor sub-circuit;
    proceeding a partial scan procedure with said physical inductive loop as the center, and scanning through at least three physical inductive loops, and obtaining at least three voltage signals; and
    identifying a logical address of said battery-less pointer device through said three voltage signals and said inductive loop deployment table; whereby coordinates of said battery-less pointer device on said multi-induction loop layout are generated.

2. The method according to claim 1, wherein said each physical inductive loop comprises a plurality of logical inductive loops.

3. The method according to claim 2, wherein said each logical inductive loop and adjacent logical inductive loops belong to different said physical inductive loops.

4. The method according to claim 1, wherein said inductive loop deployment table comprises a plurality of physical addresses, said plurality of physical addresses being addresses of said plurality of physical inductive loops.

5. The method according to claim 1, wherein said inductive loop deployment table comprises an adjacency table of said plurality of physical inductive loops.

6. The method according to claim 5, wherein the first physical address of each line on said adjacency table is a physical inductive loop, each line of said adjacency table comprising a combination of three different physical inductive loops, the feature of which is uniqueness.

7. The method of claim 1, wherein said three voltage signals are the first, second, and third strongest signals obtained in said partial scan procedure, said three strongest signals having a feature that the second strongest signal and the third strongest signal are located on two sides of the first strongest signal.

8. A method of generating pointing coordinate information for a battery-less pointer device in an electromagnetic inductive system, said method comprising:
    proceeding a full scan procedure by a plurality of physical antenna loops for launching a first electromagnetic signal;
    receiving said first electromagnetic signal by a battery-less pointer device and launching a second electromagnetic signal for part of the plurality of physical antenna loops located on said battery-less pointer device to receive said second electromagnetic signal;
    transmitting said second electromagnetic signal to a microprocessor sub-circuit;
    searching a physical antenna loop address with maximum voltage signal through an antenna loop deployment table in said microprocessor sub-circuit;
    proceeding a partial scan procedure with said physical antenna loop as the center, scanning through at least three physical antenna loops, and obtaining at least three voltage signals; and
    confirming the logical address of said battery-less pointer device through comparison of said three voltage signal and judgment of said antenna loop deployment table, whereby coordinates of said battery-less pointer device relative to a multi-induction loop layout containing said physical antenna loops are generated.

9. The method of claim 8, wherein said three voltage signals are the first, second, and third strongest signals obtained in said partial scan procedure, said three strongest signals having a feature that the second strongest signal and the third strongest signal are located on two sides of the first strongest signal.

10. An electromagnetic inductive system, said electromagnetic inductive system comprising:
    a battery-less pointer device, inducing a first electromagnetic signal and storing energy through an electromagnetic induction in order to transmit a second electromagnetic signal;
    an inductive loops sub-circuit, possessing a multi-induction loop layout, said inductive loops sub-circuit transmitting said first electromagnetic signal and inducing said second electromagnetic signal, wherein said multi-induction loop layout comprises:
    a plurality of physical inductive loops is formed by connection of a plurality of ⊓-type section, wherein said plurality of ⊓-type section is formed by a plurality of circling, and wherein said physical inductive loops is arranged according to an inductive loop deployment table; and a close-like region formed by said plurality of ⊓-type sections being a plurality of logical inductive loops;

an interior sub-circuit, being electrically coupled with said inductive loops sub-circuit to transmit and process said first electromagnetic signal and said second electromagnetic signal; and a microprocessor sub-circuit, being electrically coupled with said interior sub-circuit and controlling said inductive loops sub-circuits, wherein said inductive loop deployment table is defaulted in said microprocessor sub-circuit, whereby coordinates of said battery-less pointer device relative to said multi-induction loop layout are generated.

11. The electromagnetic inductive system according to claim 10, wherein said inductive loop deployment table comprises a plurality of physical addresses, said plurality of physical addresses being locations of said plurality of physical inductive loops.

12. The electromagnetic inductive system according to claim 10, wherein each logical loop and its adjacent logical loops of said inductive loop deployment table belong to different physical inductive loops.

13. The electromagnetic inductive system according to claim 10, wherein said inductive loop deployment table comprises an adjacency table of said plurality of physical inductive loops.

14. The electromagnetic inductive system according to claim 13, wherein the first physical address of each line on said adjacency table is, respectively, a physical inductive loop, and each line of said adjacency table comprises a combination of three physical inductive loops with three different physical addresses, the feature of which is uniqueness.

* * * * *